United States Patent [19]
Hepburn et al.

[11] Patent Number: 6,025,906
[45] Date of Patent: Feb. 15, 2000

[54] METHODS AND APPARATUS FOR DETECTING CORE/CLADDING INTERFACES IN OPTICAL WAVEGUIDE BLANKS

[75] Inventors: Jerry L. Hepburn; Franziska L. Lorey, both of Corning; David A. Pastel, Horseheads; Robert S. Wagner, Corning, all of N.Y.

[73] Assignee: Corning Incorporated, Corning, N.Y.

[21] Appl. No.: 09/156,729

[22] Filed: Sep. 17, 1998

Related U.S. Application Data

[60] Provisional application No. 60/060,679, Sep. 25, 1997.
[51] Int. Cl.[7] .................................................. G01N 21/00
[52] U.S. Cl. ........................................... 356/73.1; 356/426
[58] Field of Search ..................... 356/73.1, 426, 356/386; 250/559.24, 559.28

[56] References Cited

U.S. PATENT DOCUMENTS

| | | | |
|---|---|---|---|
| 4,168,907 | 9/1979 | Presby | 356/73.1 |
| 5,118,954 | 6/1992 | Grosso | 356/73.1 |
| 5,408,309 | 4/1995 | Shimada et al. | 356/73.1 |

*Primary Examiner*—Frank G. Font
*Assistant Examiner*—Tu T. Nguyen
*Attorney, Agent, or Firm*—Robert L. Carlson

[57] ABSTRACT

Methods and apparatus for detecting air/cladding and core/cladding interfaces of blanks (13) used to produce optical waveguide fibers are provided. A beam of coherent light (30) is scanning across the blank (13) and spatial light intensity patterns produced thereby (FIG. 5) are detected and analyzed. Air/cladding interfaces correspond to a decrease in the width of a unimodal spatial light intensity pattern as the beam moves towards the center of the blank (FIGS. 5A and 5B). Core/cladding interfaces correspond to the onset of an at least bimodal spatial light intensity pattern as the beam moves towards the center of the blank (FIGS. 5D and 5E). By rotating the blank and repeating the measurement process at two or more angular positions, concentricity and ellipticity values for a blank can be determined.

21 Claims, 11 Drawing Sheets

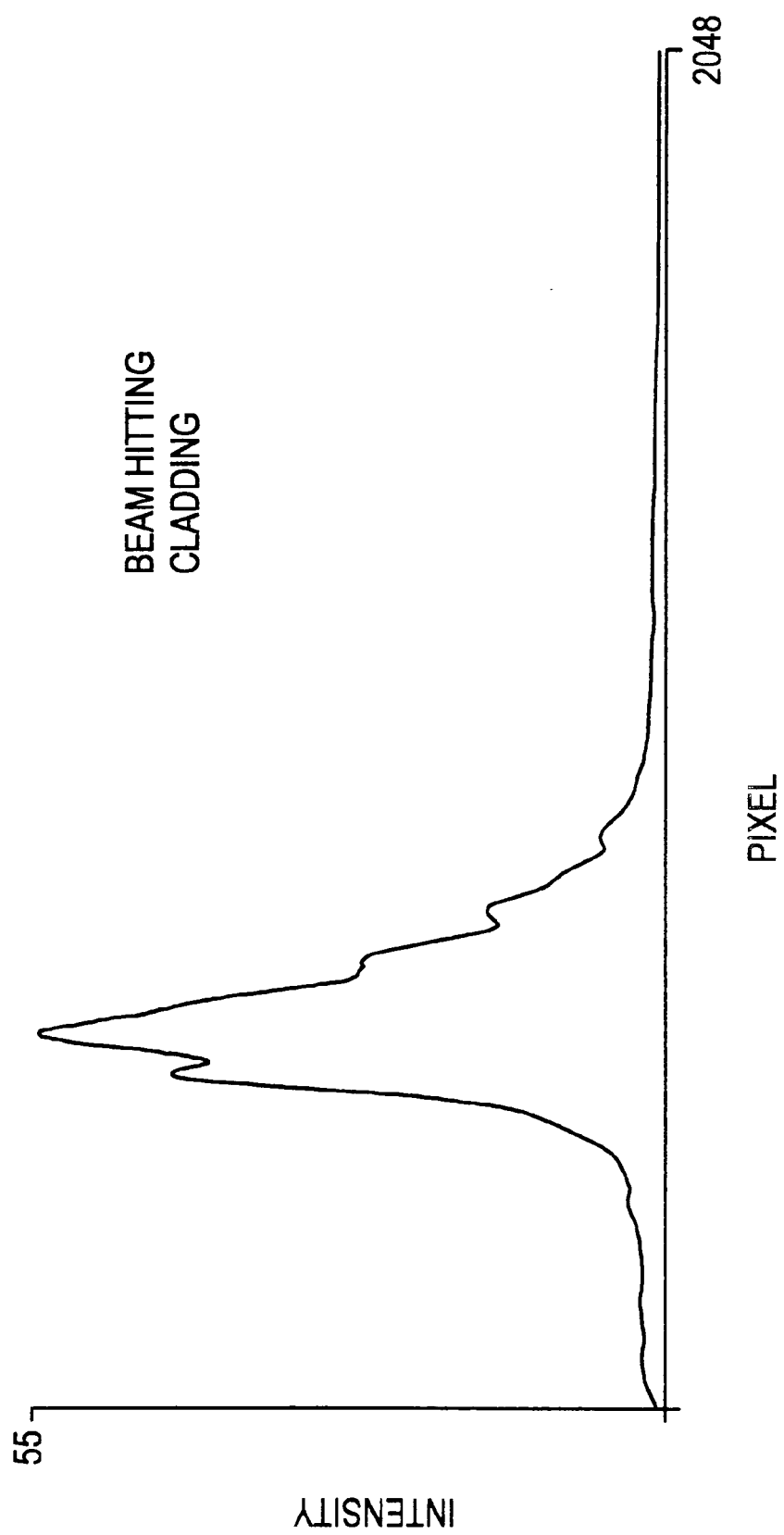

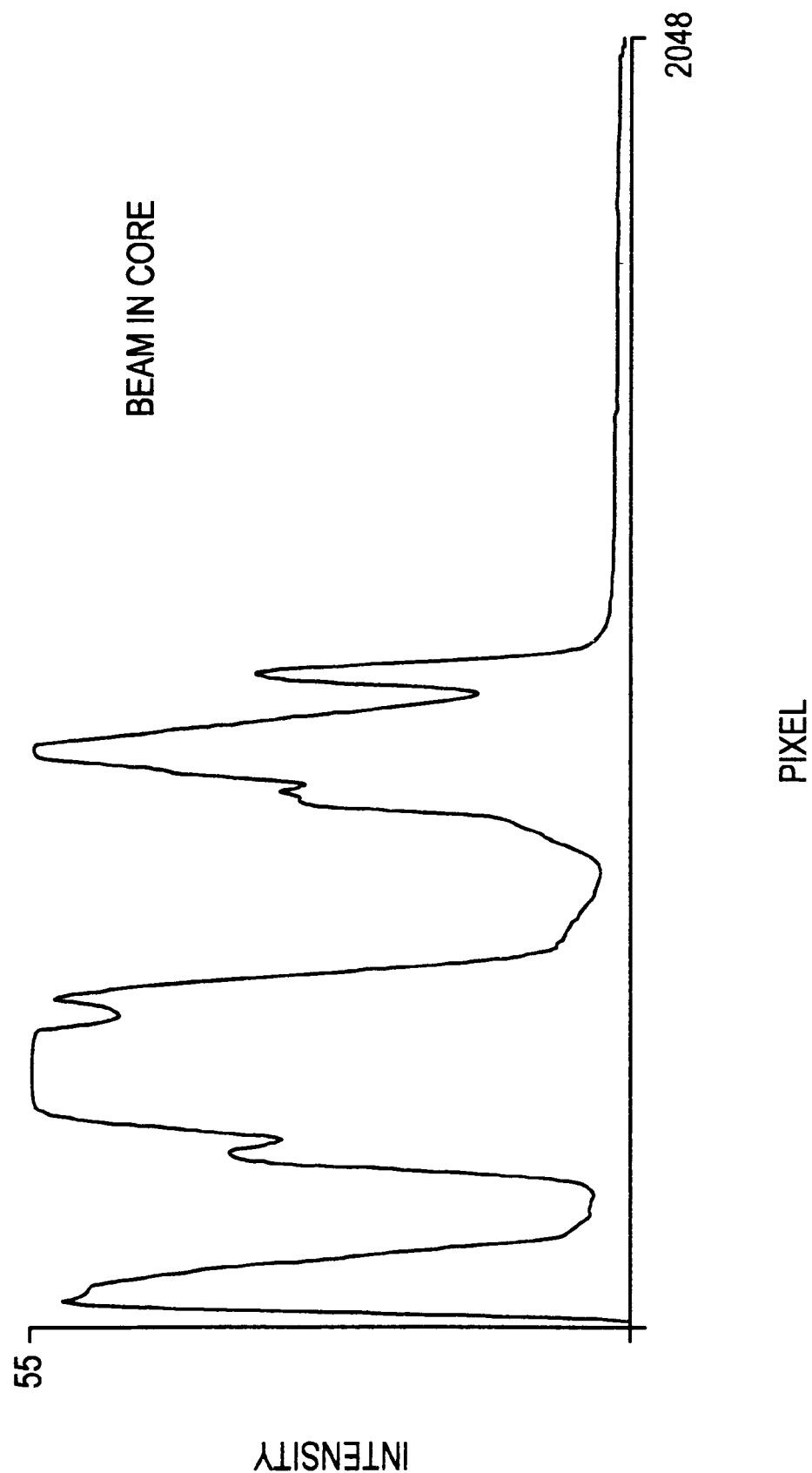

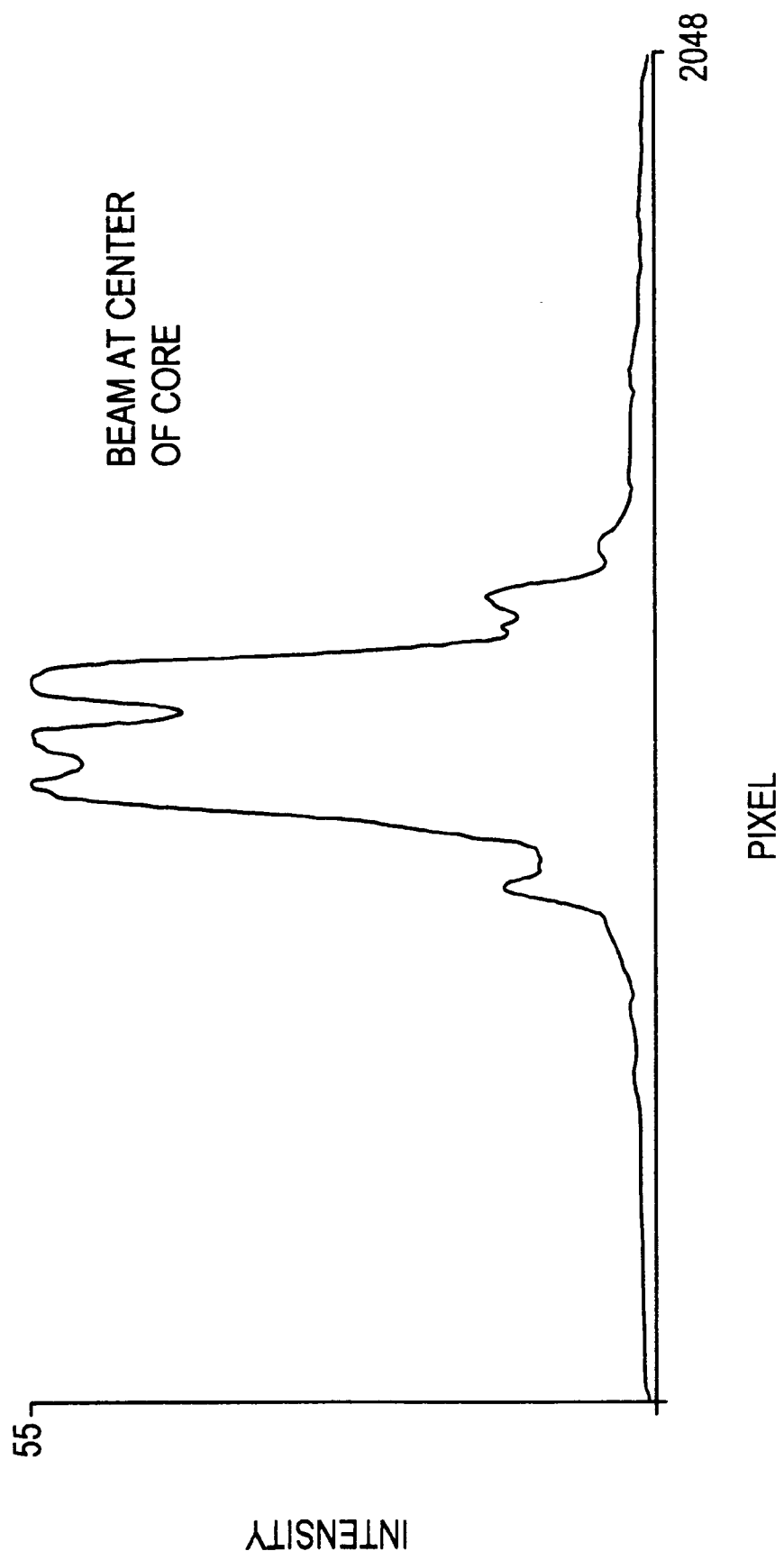
FIG.5G BEAM AT CENTER OF CORE

METHODS AND APPARATUS FOR DETECTING CORE/CLADDING INTERFACES IN OPTICAL WAVEGUIDE BLANKS

This Application is a continuation of U.S. Provisional Application Ser. No. 60/060,679, filed Sep. 25, 1997.

FIELD OF THE INVENTION

This invention relates to optical waveguide fibers and, in particular, to methods and apparatus for detecting the core/cladding interface of a blank used to produce such fibers. The core/cladding interface is also referred to herein as the edge of the core.

BACKGROUND OF THE INVENTION

As is well known in the art, optical waveguide fibers have a central core surrounded by a cladding, with the core having a higher index of refraction than the cladding. Such fibers are produced by heating the end of a "blank" (also known as a "preform") and drawing fiber from the blank, the diameter of the fiber being controlled through the draw rate. As in the fiber, the blank has a higher index central core surrounded by a lower index cladding, the cross-sectional size of the blank's core and cladding being, of course, much larger than the fiber's core and cladding, e.g., ten to one hundred times larger.

Since various geometric properties of a fiber, e.g., core/cladding diameter ratio and core/cladding concentricity, are determined by the corresponding geometric properties of the blank from which the fiber is drawn, workers in the art have developed various devices for measuring blank geometry. One widely used device for determining a blank's diameter is that sold by LaserMike, Inc. (Dayton, Ohio) under the LASERMIC trademark. This device operates by transversely illuminating a blank and detecting the outer edge of the blank's shadow using an electronic camera.

U.S. Pat. No. 5,408,309 to Shimada et al. describes the use of transverse illumination to measure core/cladding concentricity and blank ellipticity. The patent discusses determining concentricity and ellipticity by rotating a blank and detecting the location of the edges of the core and the cladding as a function of rotation angle with an electronic camera. Various equations are presented for analyzing the camera recordings depending on whether the blank exhibits ellipticity and a decentered core or just one of these defects. An embodiment employing a laser light source is also described wherein residual stress at the interface between the core and cladding layer is said to provide clear images of those layers.

SUMMARY OF THE INVENTION

In view of the foregoing, it is an object of the present invention to provide improved techniques for detecting the location of the core/cladding interface of blanks used to produce optical waveguide fibers. It is also an object of the invention to provide improved techniques for detecting the location of both the core/cladding interface and the outer edge of the cladding. It is a further object of the invention to use the so detected locations of the core/cladding interface and of the outer edge of the cladding to determine core/cladding concentricity, core ellipticity, and blank (cladding) ellipticity. Given the core diameter and cladding diameter from this measurement, along with known parameters for the fiber and its intended use (specifically, the draw ratio, the index of refraction of the core and cladding, and the operating wavelength), the mode field diameter (MFD) and cutoff wavelength can also be predicted for the fiber.

To achieve these and other objects, the invention provides a method for detecting a core/cladding interface in a blank which comprises:

(a) providing a beam of coherent light, e.g., a laser beam;
(b) transversely scanning the beam across at least a portion of the blank;
(c) detecting light which has passed through the blank as the beam is scanned; and
(d) detecting the core/cladding interface by identifying the onset of a spatial intensity pattern in the detected light which is at least bimodal.

In accordance with the invention, it has been discovered that a lobed diffraction/interference type of spatial intensity pattern, i.e., a pattern which is at least bimodal, is generated when a scanned laser beam passes from the cladding into the core of a blank. The pattern increases in intensity (and in the number of detectable lobes) as the beam moves into the core. Accordingly, by establishing a threshold for the onset of such a pattern, the core/cladding interface can be readily detected.

In certain preferred embodiments, the coherent beam of light is made to converge at a location corresponding to the nominal location of the blank's longitudinal axis, i.e., the beam is focused at the nominal location of the center of the blank. Such convergence has been found to increase the intensity of the lobed pattern produced by the core/cladding interface.

In accordance with further aspects of the invention, a method for inspecting a blank is provided which comprises:

(a) providing a light source and a detector on opposite sides of the blank, the light source producing a beam of coherent light and the detector being capable of detecting spatial light intensity patterns;
(b) transversely moving the beam across the blank while detecting spatial light intensity patterns at the detector;
(c) identifying the edges of the cladding as transverse locations where a decrease in the width of a unimodal spatial light intensity pattern occurs upon movement of the beam towards the longitudinal axis, said occurrence preferably being determined with reference to a predetermined threshold; and
(d) identifying the edges of the core as transverse locations where an at least bimodal spatial light intensity pattern appears upon movement of the beam towards the longitudinal axis, said appearance preferably being determined with reference to a predetermined threshold.

If desired, the inspection method can also include identifying the center of the blank as that transverse location where a unimodal spatial light intensity pattern is surrounded on both sides by an at least bimodal spatial light intensity pattern for transverse movement of the beam.

Using this inspection method, core/cladding concentricity, cladding ellipticity, and/or core ellipticity can be determined by identifying (locating) the edges of the cladding and the core at a first angular position and then rotating the blank through a predetermined angle, e.g., 90°, and again identifying (locating) the edges of the cladding and the core. The data obtained in this way can be used to derive concentricity and/or ellipticity values for the axial location for which the measurements were performed. Alternatively, rather than using just two measurements, multiple measurements at a series of angles can be made.

Preferably, the inspection method is repeated at a plurality of axial locations along the blank's length, with concentricity and/or ellipticity values being determined for each location.

The invention also provides apparatus for inspecting a blank which comprises:

(a) means for supporting the blank, e.g., a system of support rollers and belts which contacts the blank at its ends from below the blank and which preferably can be used to rotate the blank about its longitudinal axis through predetermined angles;

(b) means for producing a beam of coherent light, e.g., a laser;

(c) means for causing the beam to converge in the vicinity of the nominal location of the blank's longitudinal axis, e.g., a moveable focusing lens, where the nominal location of the longitudinal axis can, for example, be determined using the LASERMIC device discussed above;

(d) means for transversely scanning the beam across the blank, e.g., a robotics system using, for example, DC servomotors, for moving the laser and the focusing lens in a plane normal to the blank's longitudinal axis;

(e) means for detecting spatial light intensity patterns, e.g., a linear CCD camera; and (f) means for directing light onto the means for detecting as the means for transversely scanning scans the beam across the blank, e.g., a lens system which directs both the spatial light intensity patterns indicative of the air/cladding interface and the patterns indicative of the core/cladding interface onto the CCD camera.

Preferably, the robotics system is capable of moving the laser, focusing lens, CCD camera, and lens system along the length of the blank so that variations in the geometry of the blank along its length can be determined.

BRIEF DESCRIPTION OF THE DRAWINGS

FIGS. 5A–5G are drawings of spatial light intensity patterns generated as a coherent light beam is scanned across a blank.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to the identification of air/cladding and core/cladding interfaces by means of changes in the spatial light intensity patterns which a beam of coherent light produces when it is directed at (aimed at) different regions of a blank.

Figure 1:
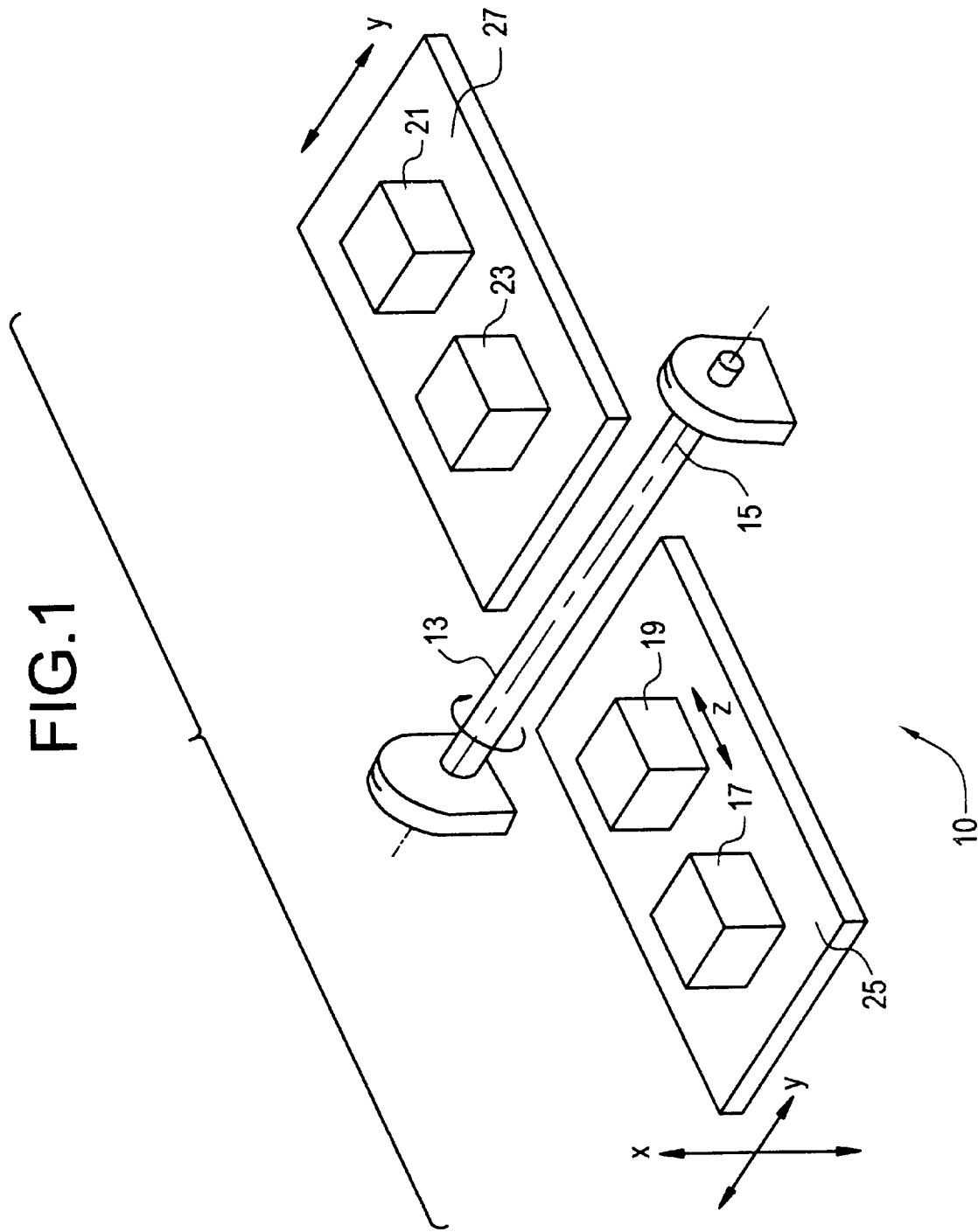
FIG. 1 is a stylized, schematic drawing of apparatus which can be used in the practice of the invention.

FIG. 1 schematically illustrates apparatus which can be used to perform such an identification. As shown in this figure, blank 13 is supported at its ends so that it can be rotated about its longitudinal axis 15. The blank is shown supported in a horizontal orientation in FIG. 1, as is preferred, although a vertical orientation can also be used if desired.

Measurement apparatus 10 comprises: (1) light source 17, e.g., a 1.0 mW laser diode operating at 650 nm and fitted with a 4X beam expander, which produces a collimated beam of coherent light; (2) moveable lens 19 which focuses the beam at the nominal center of the blank; (3) detector 21 which detects the spatial light intensity patterns resulting from illumination of the blank by the beam; and (4) lens system 23 which ensures that the patterns of interest reach detector 21 as the beam is scanned across the blank.

Apparatus 10 also preferably includes a suitably programmed computer system (not shown) for processing, e.g., filtering and analyzing, the output of detector 21 to identify the air/cladding and core/cladding interfaces, as well as for calculating concentricity and ellipticity values for the blank. For example, the detected spatial light intensity patterns can be filtered and analyzed using commercially available software such as that sold under the LABVIEW trademark by National Instruments of Austin, Tex. The computer system should also receive inputs from the robotics system regarding the location of the laser beam so that the analyzed data from the detector can be associated with particular locations in the blank.

Components 17, 19, 21, and 23 are shown supported by tables 25 and 27 in FIG. 1, which are intended to schematically illustrate a robotics system. Both tables are moveable in the y-direction for performing measurements at different locations along the length of blank 13. Table 25 is also moveable in the x-direction for transverse scanning of the light beam across the blank. Robotics systems commercially available from various vendors can be used in the practice of the invention.

As indicated above, the nominal center of blank 13 can be determined using a LASERMIC or similar measurement device (not shown). When a LASERMIC is used, the nominal center of the blank is taken as the midpoint of the cladding's shadow as determined by the device. The device for obtaining nominal center values can be carried by the robotics system so that the location of the nominal center can be adjusted as the measurement system is moved along the length of the blank. Alternatively, nominal center values can be obtained at a separate testing station and those values can be provided to the computer system of apparatus 10.

Once the nominal center has been determined, the position of focusing lens 19 is adjusted so that the distance Z between the focusing lens and the nominal center satisfies the following equation:

$$Z = F - (n-1)R$$

where F is the focal length of the focusing lens, n is the index of refraction of the cladding, and R is the cladding radius. In this way, the beam produced by light source 17 converges in the vicinity of the blank's nominal longitudinal axis. Such convergence has been found to improve the signal strength at detector 21.

In particular, convergence to a spot size of approximately 20 microns has been found to provide such an improvement in signal strength. (Note that the beam produced by light source 17 will not, in general, be circular. For example, diode lasers are known to produce elliptically shaped beams. In such cases, the major axis of the ellipse is preferably oriented orthogonal to the blank's longitudinal axis (i.e., vertically in FIG. 1), and the size of the focused beam in this direction is preferably less than 20 microns.) Preferably, the convergence is held for a distance of approximately 2 millimeters along the direction of the light beam (the z-direction in FIG. 1). In practice, a single lens element having a focal length of 150 mm and a clear aperture greater than the diameter of the light beam at the lens has been found suitable for use as a beam focusing lens.

Figure 2:
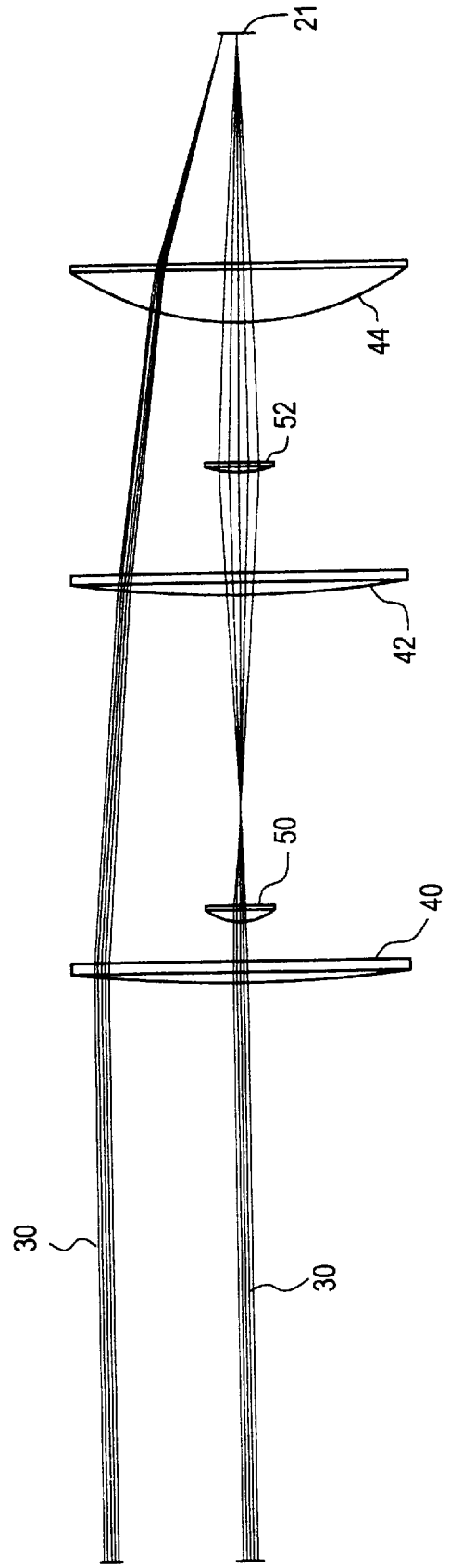
FIGS. 2–4 are schematic drawings of a lens system which can be used in the practice of the invention.
Figure 3:
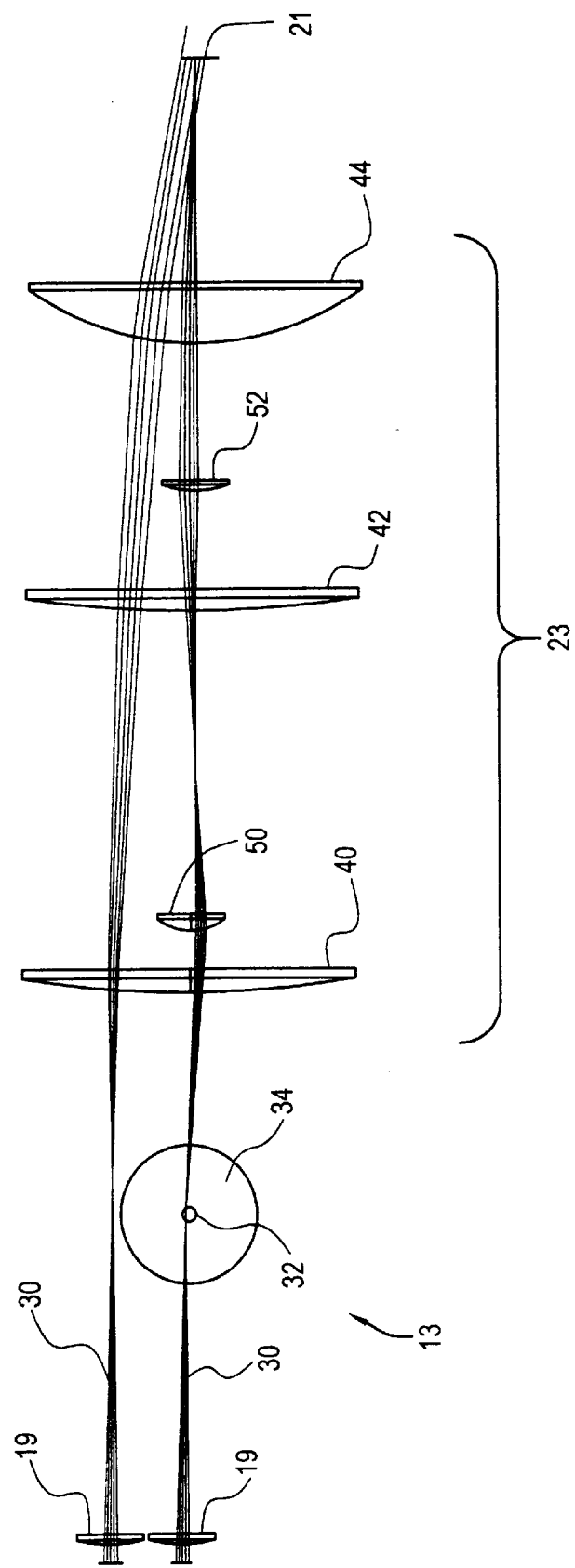
Figure 4:
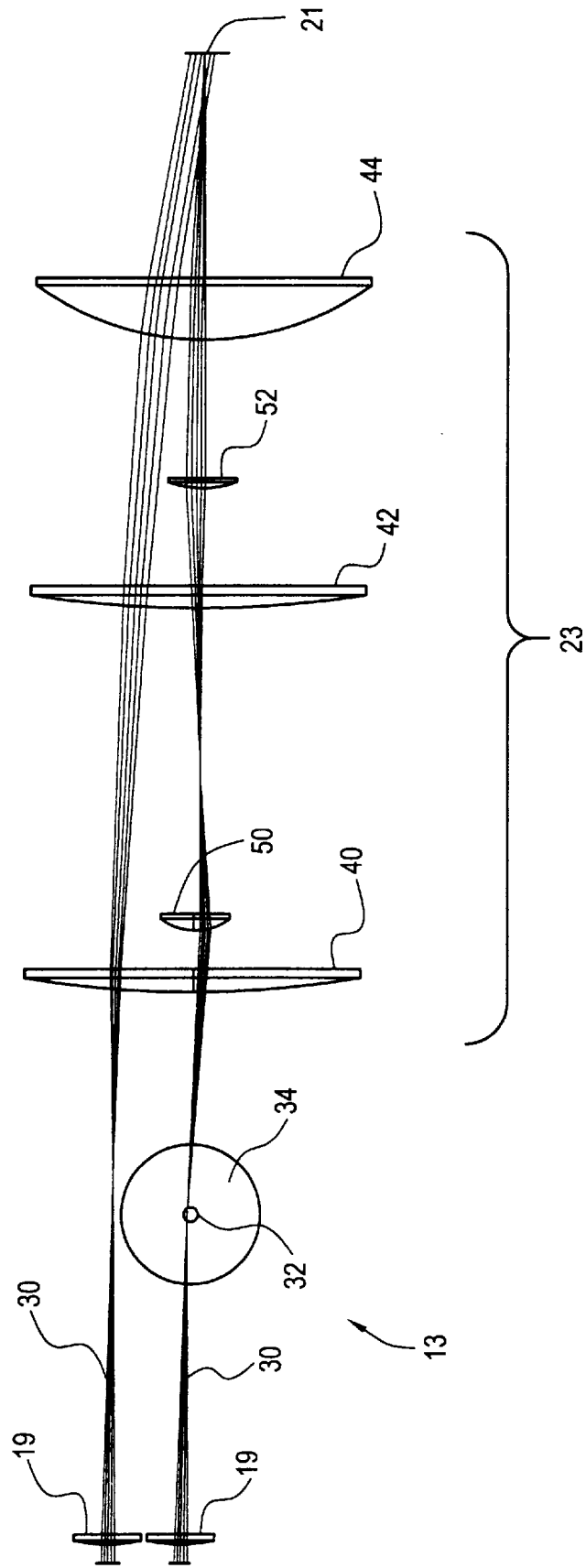

FIGS. 2–4 show a suitable lens system 23 for directing the spatial intensity patterns of interest onto detector 21. FIG. 2 shows the system prior to the introduction of a blank. As can be seen in this figure, collimated light beam 30 converges at detector 21 whether the beam is on-axis or off axis, i.e., the detector is at the lens system's focal point.

FIGS. 3 and 4 illustrate the operation of the system for a small and a large blank, respectively. In these figures, the blank's core is identified by the reference number 32 and its cladding by the number 34.

As illustrated in these figures, the combination of large lens elements 40,42,44 and small lens elements 50,52 ensures that at least a part of beam 30 impinges on detector 21 for the beam just outside the cladding (upper beam in each figure) and for the beam just outside of the core (lower beam in each figure). Since these are the locations where the most important data regarding blank geometry is obtained, the figures show that such a five-element lens system achieves the goal of directing the spatial intensity patterns of interest onto the detector for a range of blank sizes.

Suitable focal lengths and lens spacings (center-to-center) for the lens system of FIGS. 2–4 are as follows:

| Lens Element | Focal Length (mm) | Lens Spacing (mm) |
| --- | --- | --- |
| 40 | 1000 | 25 |
| 50 | 50 | 140 |
| 42 | 1000 | 50 |
| 52 | 100 | 75 |
| 44 | 250 | | where the distance between the center of lens element 40 and the longitudinal axis of the blank is 250 millimeters, the distance between the center of lens element 44 and detector 21 is 300 millimeters, and the active area of detector 21 is 16 millimeters long. The clear apertures of the lens elements are chosen to be large enough to capture beam 30 for the sizes of blanks which are to be inspected. More generally, lens system 23 should have a field of view which is large enough to put enough of the light intensity pattern on the detector so that the outer edge of the cladding and the core/cladding interface can be found.

FIGS. 5A through 5G illustrate the spatial light intensity patterns which are observed at detector 21 as beam 30 is scanned across a blank. The patterns of these figures were generated using the apparatus of FIG. 1 and the lens system of FIGS. 2–4. The output of the detector comprised light intensity values for 2048 pixels.

Figure 5A:
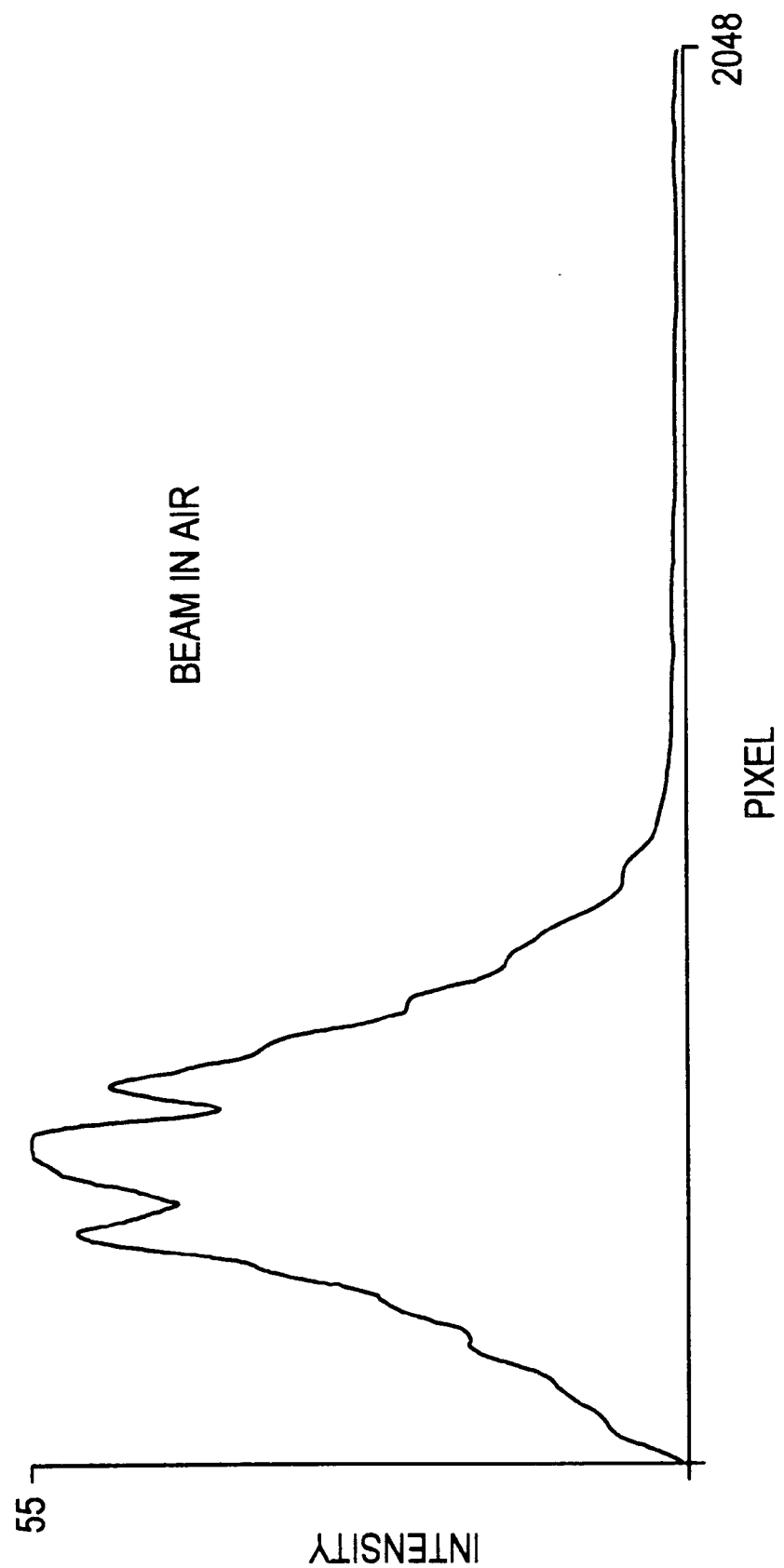

FIGS. 5A and 5B show the unimodal patterns which are observed when the light beam is outside of the cladding (FIG. 5A) and is just hitting but not fully within the cladding (FIG. 5B). A comparison of these figures shows that the width of the pattern in FIG. 5B is smaller than the width in FIG. 5A.

This reduction in width is the result of a portion of the beam being refracted away from the detector by the cladding.

The reduction in width between FIGS. 5A and 5B can be detected directly from the output data of the detector or more conveniently by calculating the standard deviation of that data, a reduction in the standard deviation corresponding to a reduction in the width of the pattern since the maximum intensity of the pattern does not increase as the beam hits the cladding. By correlating reductions in the width of the unimodal pattern with diameter measurements made using an alternate technique, e.g., diameter measurements made using the LASERMIC device discussed above, a threshold value for the reduction which gives substantially identical diameter values can be determined.

Alternatively, the threshold value can simply be chosen to be large enough to avoid an erroneous detection of the edge of the cladding as a result of noise. In this latter case, the cladding diameter measurements made using the procedures of the invention serve as their own standard.

Figure 5C:
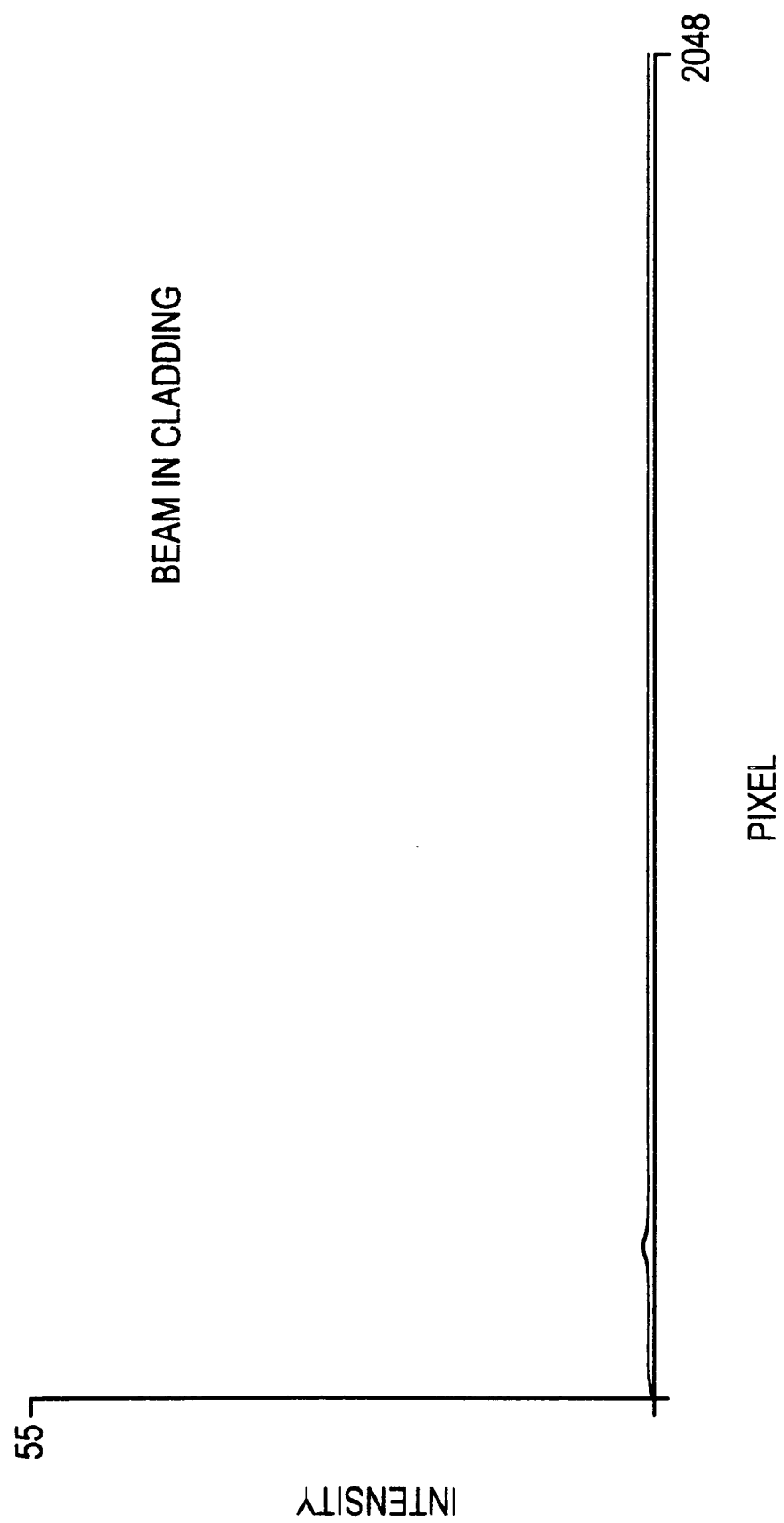

FIG. 5C shows the output of the detector when the beam is fully within the cladding but still far from the edge of the core. The cladding now refracts the entire beam so that substantially no light from the beam reaches the detector. The output of the detector is thus essentially zero.

Figure 5D:
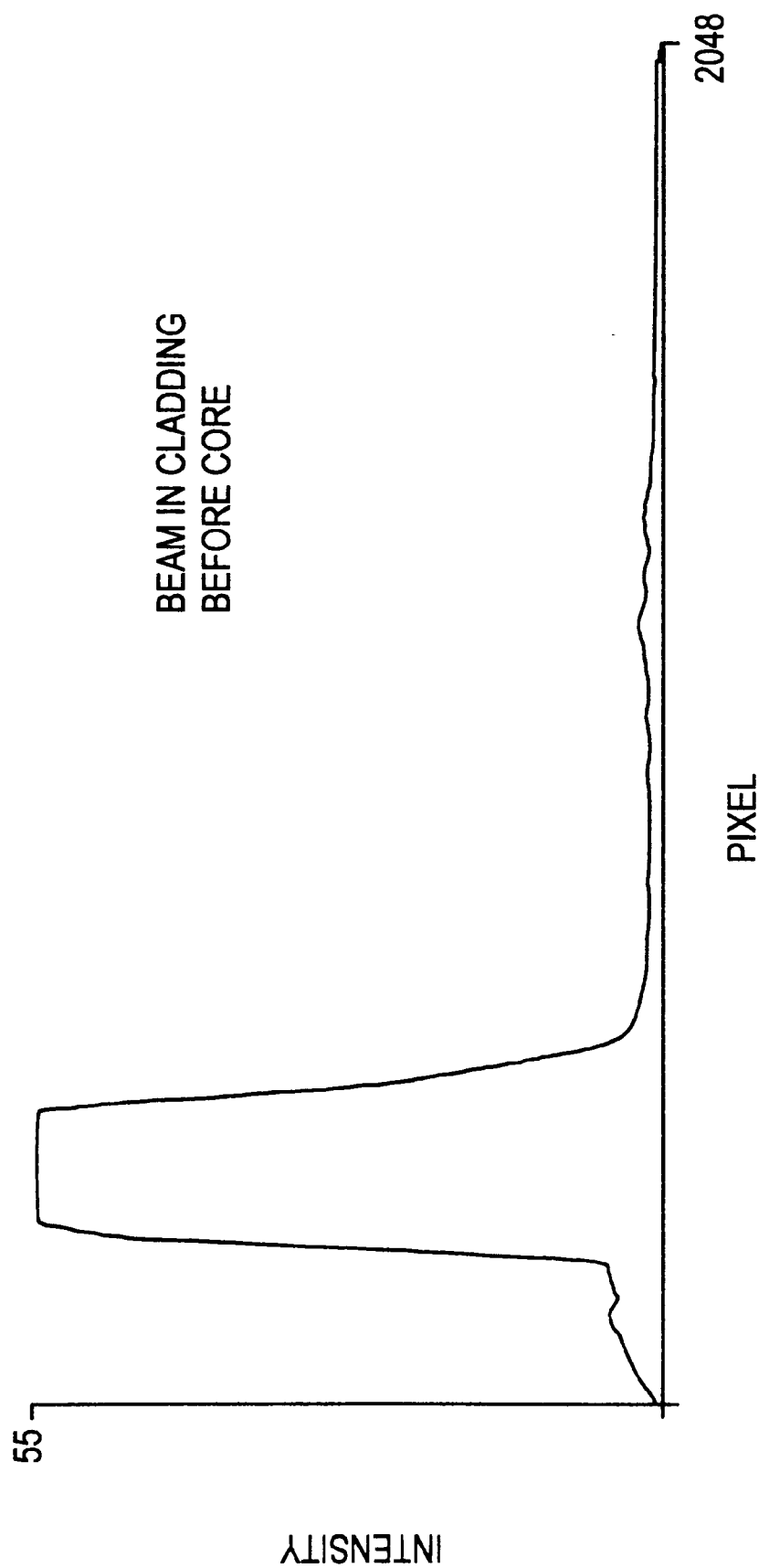

FIG. 5D shows the output of the detector with the beam still fully within the cladding, but now near to the edge of the core. A unimodal signal has returned under this condition since the beam now hits the cladding at a near normal angle, thus reducing the ability of the cladding to refract the beam away from the detector.

Figure 5E:
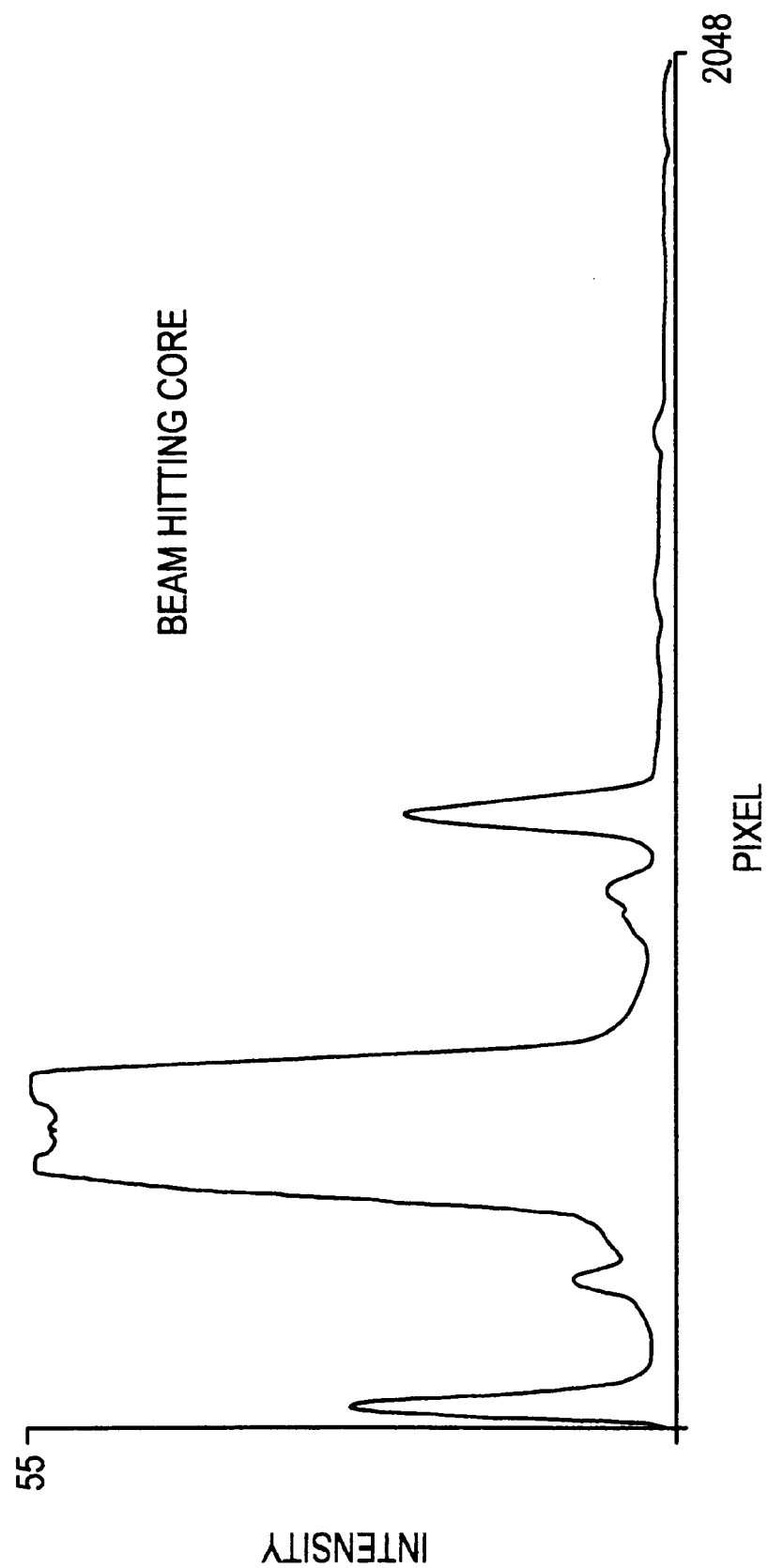

FIG. 5E shows what happens when the beam hits the edge of the core. Side lobes are clearly evident in this figure, i.e., the pattern is no longer unimodal but is now at least bimodel. As the beam continues to move into the core, the intensity of the pattern and its multimodal character both increase. Indeed, a larger detector and/or a different lens system 23 would reveal that the pattern includes a series of lobes of decreasing intensity, as is characteristic of a diffraction/interference type of spatial light intensity pattern. The lobes of FIG. 5E (as well as those of FIG. 5F) comprise the central lobe and first side lobe.

Although not wishing to be bound by any particular theory of operation, it is believed that the lobed pattern is due to striae within the core which act as a diffraction grating and thus produce a diffraction/interference type of spatial light intensity pattern, i.e., a pattern having a central lobe and side lobes. In particular, it has been found that a blank which does not have striae within its core does not produce a lobed pattern.

The specific location and sizes of the various lobes produced by a blank which does have striae will depend on, among other things, the radial spacing of the striae including the uniformity of such spacing, the index of refraction changes making up the striae including the uniformity of such changes between striae and, at least to some extent, within any given stria, and, again at least to some extent, the radial extent of the individual stria. Because of the large number of variables involved, it has been found that core diameter measurements taken at two circumferential locations separated by 180° can be somewhat different, e.g., the measurements can differ by approximately 0.1 microns or more. Although again not wishing to be bound by any particular theory of operation, it is believed that these differences can be due to variations in the striae at different circumferential locations around a blank produced during the manufacturing process.

The onset of the at least bimodal pattern of FIG. 5E can be determined using a variety of peak recognition techniques. One technique which has been found to work successfully in practice comprises examining the region of the detector output where a side lobe is expected to occur and defining a threshold for this lobe in terms of a minimum height and minimum width combination. The threshold can be adjusted so that the core measurements made on the blank correspond with, for example, core/cladding concentricity and cutoff wavelength measurements made on fiber drawn from the blank.

FIGS. 5F and 5G show the output from the detector for the beam well within the core (FIG. 5F) and at the center of the core (FIG. 5G). A comparison of FIGS. 5E and 5F shows that the intensity of the peaks increase as the beam moves further into the core. FIG. 5G shows that the at least bimodal pattern seen by the detector becomes unimodal when the beam is aligned with the center of the core.

The patterns of FIGS. 5A through 5F are repeated in reverse order as the beam moves past the center of the core into the body of the core and then into the cladding and finally back into air. This reverse set of patterns can be used to determine the location of the edges of the core and the cladding for the lower half of the blank. Alternatively, the beam can be shifted to a point below the blank and scanned upward. This latter approach is preferred since the patterns will occur in the same order as shown in FIG. 5 and thus only one set of algorithms are required to perform the analysis.

In practice, the system of FIGS. 1–5 has been found to rapidly and reliably measure core and cladding geometries of blanks having a variety of sizes. Measurements made with the system have been found to correlate with core/cladding concentricity, cutoff wavelength, and mode field diameter measurements performed on fibers drawn from blanks which were inspected using the methods and apparatus of the invention. As noted above, however, some variation in measured values has been observed when a blank is measured in one orientation, rotated by 180°, and then remeasured. If such variation is objectionable for a particular application of the invention, it can be accommodated by, for example, consistently orienting a blank in a single orientation using, for example, a non-circularly symmetric feature associated with an end of a blank.

Although specific embodiments of the invention have been described and illustrated, it is to be understood that modifications can be made without departing from the invention's spirit and scope. For example, other light sources, lenses (e.g., lenses with aspherical surfaces), detectors (including multiple detectors), and software programs besides those discussed above can be used in the practice of the invention. Similarly, instead of moving the light source, the beam can be scanned across the blank using, for example, a multi-faceted rotating mirror. Also, rather than using an electronic detection system, the spatial light intensity patterns of the invention can be viewed manually on a viewing screen. Similarly, a variety of blank-holding mechanisms, including a variety of mechanisms for holding a blank in a vertical or horizontal orientation and for rotating a blank, can be used in the practice of the invention.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A method for detecting a core/cladding interface in a blank used to produce an optical waveguide fiber, said blank having a longitudinal axis, said method comprising:
   (a) providing a beam of coherent light;
   (b) transversely scanning the beam across at least a portion of the blank;
   (c) detecting light which has passed through the blank as the beam is scanned; and
   (d) detecting the core/cladding interface by identifying the onset of an intensity pattern in the detected light which is at least bimodal.

2. The method of claim 1 wherein the longitudinal axis has a nominal location and the beam converges in the vicinity of that location.

3. The method of claim 1 wherein step (c) comprises providing an optical system to direct light which has passed through the blank onto a detector.

4. The method of claim 1 wherein a threshold is used to identify said onset.

5. The method of claim 1 comprising the additional steps of rotating the blank about the longitudinal axis and repeating steps (a) to (d) on the rotated blank.

6. The method of claim 1 comprising the additional steps of repeating steps (a) to (d) at a plurality of locations along the longitudinal axis.

7. A method for determining the location of a core/cladding interface in a blank used to produce an optical waveguide fiber, said blank having a longitudinal axis, said method comprising:
   (a) providing a beam of coherent light;
   (b) transversely scanning the beam across at least a portion of the blank;
   (c) detecting light which has passed through the blank as a function of the transverse position of the beam; and
   (d) identifying the onset of an intensity pattern in the detected light which is at least bimodal, the transverse position of the beam at said onset corresponding to the location of the core/cladding interface in the blank.

8. The method of claim 7 wherein the longitudinal axis has a nominal location and the beam converges in the vicinity of that location.

9. The method of claim 7 wherein step (c) comprises providing an optical system to direct light which has passed through the blank onto a detector.

10. The method of claim 7 wherein a threshold is used to identify said onset.

11. The method of claim 7 comprising the additional steps of rotating the blank about the longitudinal axis and repeating steps (a) to (d) on the rotated blank.

12. The method of claim 7 comprising the additional steps of repeating steps (a) to (d) at a plurality of locations along the longitudinal axis.

13. A method for inspecting a blank used to produce an optical waveguide fiber, said blank having a core, a cladding, and a longitudinal axis, said method comprising:
   (a) providing a light source and a detector on opposite sides of the blank, said light source producing a beam of coherent light and said detector being capable of detecting spatial light intensity patterns;
   (b) transversely moving the beam across the blank while detecting spatial light intensity patterns at the detector;
   (c) identifying the edges of the cladding as transverse locations where a decrease in the width of a unimodal spatial light intensity pattern occurs upon movement of the beam towards the longitudinal axis; and
   (d) identifying the edges of the core as transverse locations where an at least bimodal spatial light intensity pattern appears upon movement of the beam towards the longitudinal axis.

14. The method of claim 13 including the additional step of identifying the center of the blank as that transverse location where, for transverse movement of the beam, a unimodal spatial light intensity pattern is surrounded on both sides by an at least bimodal spatial light intensity pattern.

15. The method of claim 13 comprising the additional steps of rotating the blank about the longitudinal axis through a predetermined angle and repeating steps (a) to (d) on the rotated blank.

16. The method of claim 15 including the additional step of determining core/cladding concentricity from the original and repeated identifications of steps (c) and (d).

17. The method of claim 15 including the additional step of determining blank ellipticity from the original and repeated identifications of step (c).

18. The method of claim 15 including the additional step of determining core ellipticity from the original and repeated identifications of step (d).

19. The method of claim 13 comprising the additional steps of repeating steps (a) to (d) at a plurality of locations along the longitudinal axis.

20. The method of claim 13 wherein the longitudinal axis has a nominal location and the beam converges in the vicinity of that location.

21. The method of claim 13 wherein an optical system is provided in step (a) to direct light which has passed through the blank onto the detector.

* * * * *